Oct. 8, 1929.                  R. HANSEN                 1,730,572
                         BEAD RING APPLYING DEVICE
                          Filed Feb. 23, 1928        2 Sheets-Sheet 2
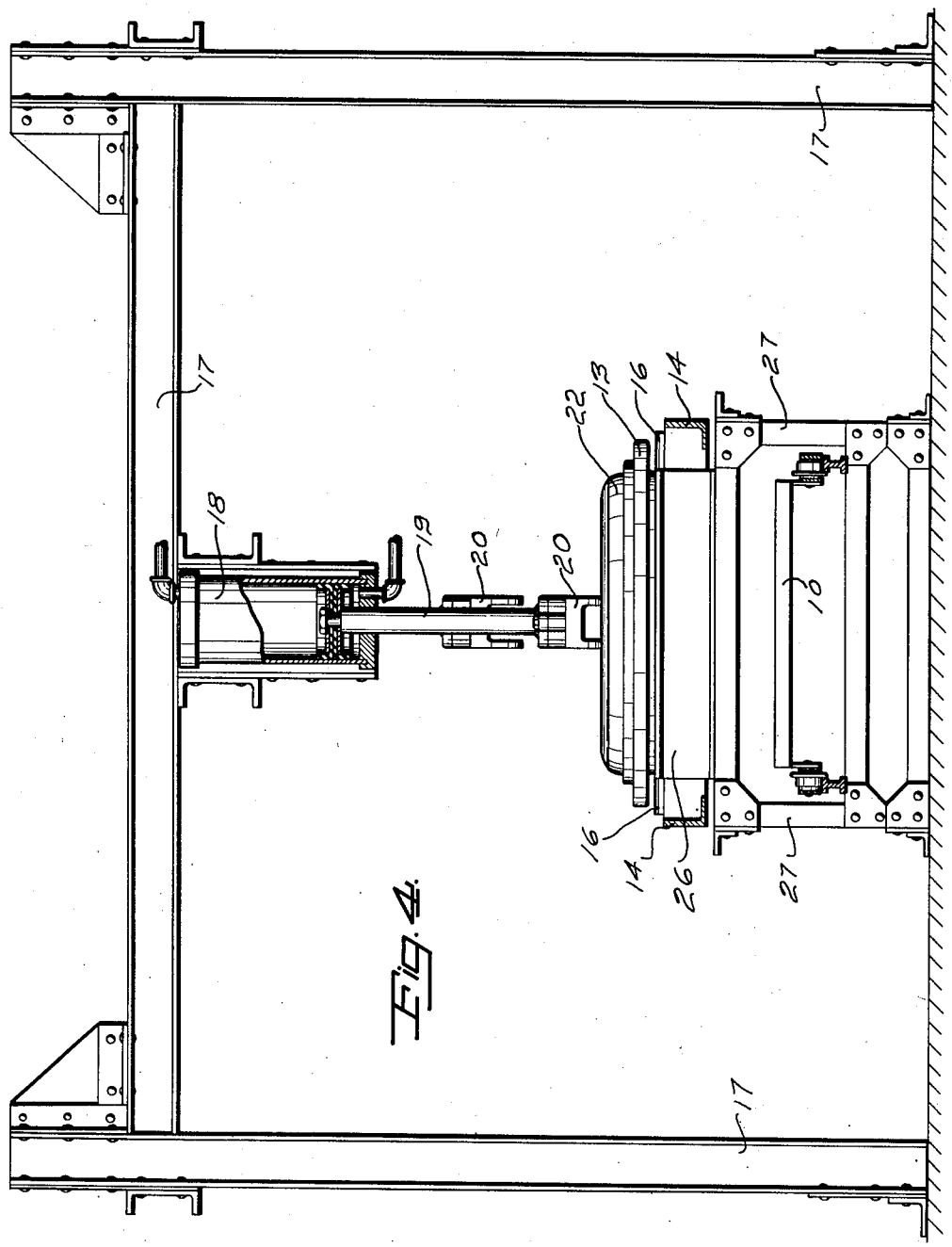
INVENTOR.
RAYMOND HANSEN.
BY
ATTORNEY.

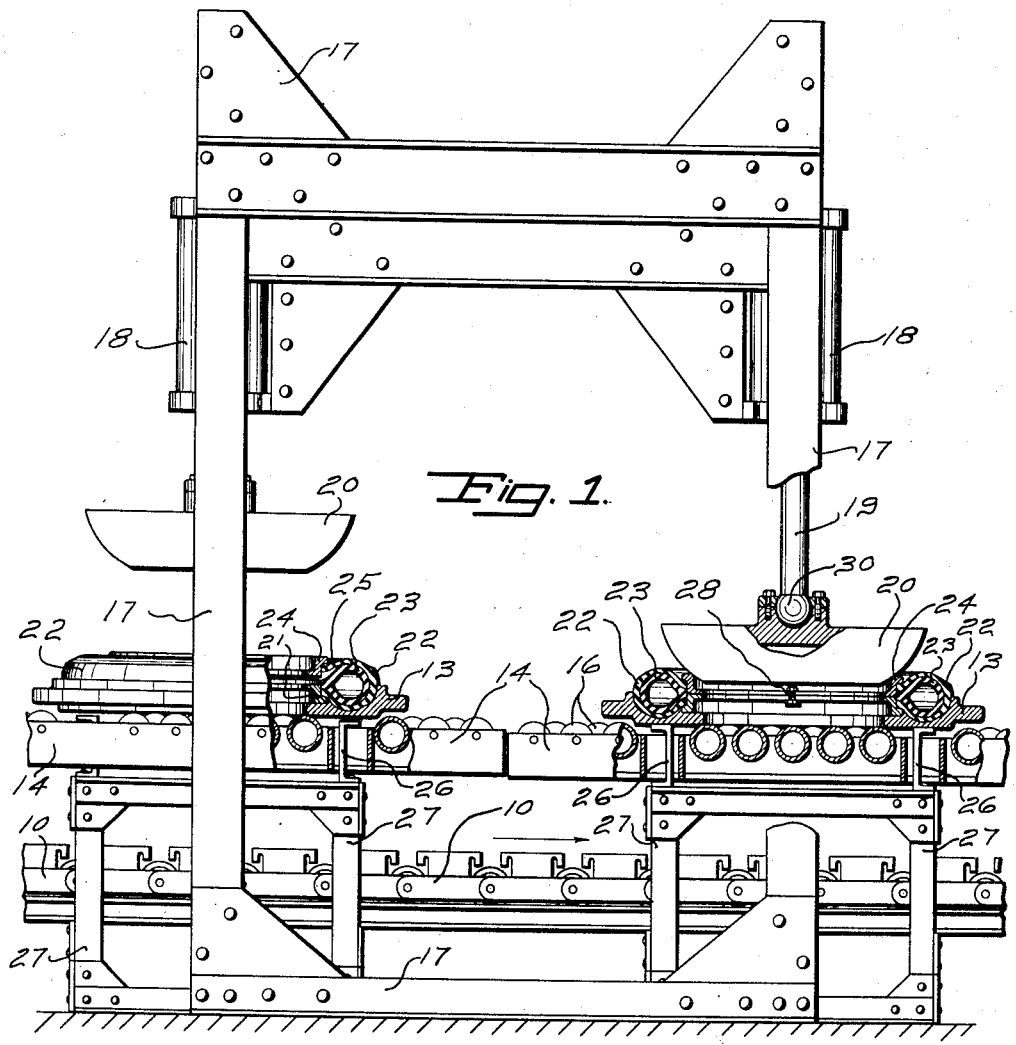
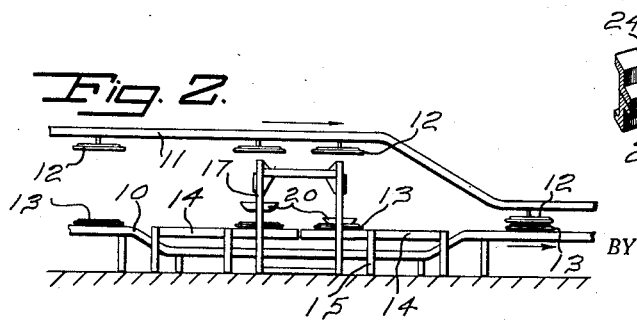
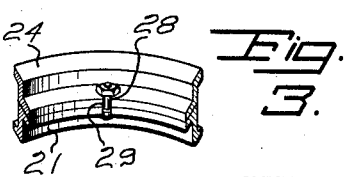

Patented Oct. 8, 1929

1,730,572

UNITED STATES PATENT OFFICE

RAYMOND HANSEN, OF CUDAHY, WISCONSIN, ASSIGNOR TO THE FISK RUBBER COMPANY, OF CHICOPEE FALLS, MASSACHUSETTS, A CORPORATION OF MASSACHUSETTS

BEAD-RING-APPLYING DEVICE

Application filed February 23, 1928. Serial No. 256,083.

In the manufacture of pneumatic tires in which the tire is cured on an expansible core or air bag under pressure, it is necessary to apply rings about the beads on the lower edges of the tire casings. The assembling of the tire casings, air bag and the two necessary rings is an operation taking considerable pressure and heretofore has usually been accomplished on a machine or press apart from the mold conveyor. This meant an undue amount of handling of the tire and rings. The purpose of my invention is to provide a bead ring applying press that will reduce the handling of the tires and rings to a minimum. Other purposes will appear in the following specification and claims.

Referring to the drawings,

Fig. 1 is a view, partly in section, showing a press built over a mold conveyor in accordance with my invention;

Fig. 2 is a diagrammatic view of a section of a mold conveyor showing the location of the bead ring press;

Fig. 3 shows a portion of the bead rings held together by a bolt; and

Fig. 4 is a view looking in at the right of Fig. 1.

The bead ring press is built over a mold conveyor 10 having an overhead track 11 adapted to convey the upper halves 12 of the molds while the lower halves 13 of the molds, as well as the bead rings, are carried by the conveyor 10. The bead ring press consists of two units, a table 14 supported by a frame 15 and having a plurality of rolls 16, and a frame 17 bridged across the conveyor 10 and supporting a double acting air cylinder 18 adapted to raise and lower, through a piston rod 19, a pressure block 20. Although two pressure units have been shown in the drawings, the device may be built with but one and the description of one is applicable to the other.

The conveyor 10 moving at a constant rate of speed carries the lower mold section 13, on which the loosely assembled tire 22, air bag 23 and bead rings 21 and 24 have been placed, the bead edges 25 of the tire 22 lying between the rings 21 and 24. As the conveyor 10 moves along the mold slides onto the table 14 as the conveyor itself passes beneath the table. The operator controlling one of the pressure blocks 20 centralizes the mold section 13 with its assembled casing 22, air bag 23, and rings 21 and 24 under the block 20. Through any convenient valve the air is forced into the upper portion of the cylinder 18, thus dropping the block 20 onto the bead ring 24. Continued pressure on the block 20 will force the mold 13 and the whole end of the table 14, on which the mold section is resting, down a fraction of an inch so that the mold will rest on channels 26 supported by a frame 27. The tables 14, as may be seen in the diagrammatic view, Fig. 2, are supported at but one end and near the center, thus allowing the portions over which the pressure blocks 20 are set to spring slightly under pressure. By the continued downward movement of blocks 20 the rings 21 and 24 are brought together and may be clamped by any convenient means, preferably by means of a bolt or series of bolts 28 slipped through aligned slots 29 in the rings.

A ball pivot 30 between the piston rod 19 and the block 20 allows the block to pivot enough to make it unnecessary that the mold lie directly in line below the cylinder 18.

Upon the reversing of the pressure in the double acting cylinder, causing the uplifting of the block 20, the table 14 will rise lifting the mold off the channels 26 enough to allow the mold to slide over the rolls 16 back onto the conveyor 10. The upper half 12 of the mold may then be brought down to fit over its mate 13. The now assembled unit is ready to be conveyed to the vulcanizers.

Having thus described my invention, I claim:

1. A press for setting bead rings over the beads of pneumatic tires comprising a table for supporting a mold section together with loosely assembled bead rings, tire casing and an air bag, and a vertically actuated block above the table adapted to press the loosely assembled parts together, the said block having its pressing edges formed to engage the inner circumferential edges of various sizes of bead rings.

2. A press for setting bead rings over the beads of pneumatic tire casings comprising a table, a plurality of mold supporting rolls forming the top of the table, a vertically actuated block above the table adapted to press loosely assembled bead rings in position against the beads of a tire casing positioned in a mold section, said block having its pressing edges formed to fit the inner circumferential edges of various sizes of bead rings, and means for conveying the mold sections to and from the table.

3. A press of the character described, comprising a table for supporting a mold section together with loosely assembled bead rings, tire casing, and air bag, and a vertically reciprocable block above the table universally pivoted to its actuating means, said block formed to fit the inner circumferential edge of various sizes of bead rings and adapted, when moved into engagement with the loosely assembled bead rings to first center them in relation to the block and, upon continued downward movement of the latter, to press the said loosely assembled bead rings together.

4. A device of the character described comprising a mold supporting table yieldable under pressure, a vertically actuated pressure block above the table, and a frame below the surface of the table adapted to support a mold section after the said table has yielded under the pressure of the said block sufficiently to deposit the mold section on the frame the table being apertured to receive the frame.

5. A device of the character described comprising a vertically actuated pressure block, a mold supporting table below the block adapted to yield under pressure, a frame below the table adapted to support a mold section after it has yielded under the pressure of the said block sufficiently to deposit the mold section on the frame the table being apertured to receive the frame, and means for conveying mold sections to and from the table.

6. In combination, a mold conveyor and a bead ring press situated over the conveyor, said press comprising a table for supporting a mold section together with loosely assembled bead rings, a tire casing, and an air bag, and a vertically actuated pressure block above the table adaptable to press the bead rings over the bead edges of a pneumatic tire in a mold section on the table.

7. In combination, a mold conveyor and a bead ring press situated over a depression in the conveyor, said press comprising a table for receiving a mold that has been carried by the conveyor and adaptable to yield under pressure, a frame below the table for supporting the table after it has yielded slightly, and a vertically actuated pressure block above the table adaptable to press loosely assembled bead rings over the bead edges of a pneumatic tire in a mold section on the table.

RAYMOND HANSEN.